United States Patent [19]
Broadt et al.

[11] 4,355,971
[45] Oct. 26, 1982

[54] VENTED MULTI-LAMP PHOTOFLASH UNIT

[75] Inventors: David R. Broadt, Lewisburg; John W. Shaffer, Williamsport, both of Pa.

[73] Assignee: GTE Products Corporation, Stamford, Conn.

[21] Appl. No.: 221,132

[22] Filed: Dec. 29, 1980

[51] Int. Cl.³ .............................................. F21K 5/02
[52] U.S. Cl. ...................................... 431/359; 362/11
[58] Field of Search ................ 431/359, 357; 362/11, 362/13, 15

[56] References Cited

U.S. PATENT DOCUMENTS

| | | | |
|---|---|---|---|
| 3,857,667 | 12/1974 | Vetere et al. | 431/359 |
| 3,956,625 | 5/1976 | Anderson | 431/359 X |
| 4,306,855 | 12/1981 | Brower et al. | 431/359 |
| 4,326,242 | 4/1982 | Broadt et al. | 362/11 |

*Primary Examiner*—Edward G. Favors
*Attorney, Agent, or Firm*—Thomas H. Buffton

[57] ABSTRACT

Venting apertures for multi-lamp photoflash units having a plurality of spaced flashlamp receiving cavities are provided intermediate the cavities whereby no direct path for fragments from a flashlamp within a cavity to the exterior of the unit is provided. In another aspect, a reflector unit having venting apertures aligned with the venting apertures of the above-described photoflash unit is enclosed with the photoflash unit with no direct path for projectiles from the photoflash lamp to the exterior of the photoflash unit.

11 Claims, 3 Drawing Figures

VENTED MULTI-LAMP PHOTOFLASH UNIT

CROSS REFERENCE TO OTHER APPLICATIONS

A concurrently filed application bearing U.S. Ser. No. 221,073 has been filed in the names of David R. Broadt and is entitled "Reflector Insert for Multi-flash Unit". Also, a concurrently filed application bearing U.S. Ser. No. 221,074 has been filed in the name of James L. Holmes and is entitled "Multi-lamp Photoflash Unit and Fabricating Process".

TECHNICAL FIELD

This invention relates to multi-lamp photoflash units and more particularly to a multi-lamp photoflash unit having a plurality of spaced cavities and a venting aperture intermediate at least one pair of spaced cavities.

BACKGROUND ART

The most common configurations for multi-lamp photoflash units are the cube array and the linear array. The cube array is best illustrated by the flashcube of U.S. Pat. No. 3,327,105 or the magicube of U.S. Pat. No. 3,730,669. The linear array is described and set forth in the flashbar of U.S. Pat. No. 3,857,667 or the flip flash of U.S. Pat. No. 4,017,728.

In the cube array, a folded reflector is disposed within a substantially cube-shaped housing member. The housing member includes a plurality of cavities and each cavity is at an angle of about 90° from the adjacent cavities. In a linear array, a row of cavities are vented back-to-back within a rigid container. Alternatively, the cavities may be aligned in a single direction and disposed within a rigid plastic container. Moreover, a flashlamp is disposed within each cavity.

As a specific illustration, FIG. 1 sets forth a prior art multi-lamp photoflash unit having a linear configuration. Herein a housing member 5 includes a plurality of individual cavities 7 which are arrayed in a back-to-back relationship and separated by a divider 9. Each of the cavities 7 has a reflective surface 11 and is formed to receive a flashlamp 13. Moreover, a venting aperture 15 is also located within each one of the cavities 7.

Thus, an aperture 15 for venting each of the cavities 7 is located within the cavity 7 and provides a passage from the interior of the cavity 7 to the exterior of the housing member 5. However, it may also be noted that the venting aperture 15 of the above-described prior art structure undesirably provides a direct pathway from the interior of the cavity 7 to the exterior of the housing member 5. Thus, fragments from a flashlamp are provided a direct path to the outside of the container whereby undesired exit of lamp fragments at energy levels which may be deleterious to anyone or anything contacted thereby is possible. Obviously, such conditions are less than desirable.

SUMMARY OF THE INVENTION

An object of the present invention is to provide an enhanced multi-lamp photoflash unit. Another object of the invention is to provide an improved housing member for multi-lamp photoflash units. Still another object of the invention is to improve the venting capabilities of a multi-lamp photoflash unit.

These, and other objects, advantages and capabilities are achieved in one aspect of the invention by a housing member having a plurality of spaced cavities each formed to receive a flashlamp and a venting aperture disposed intermediate at least one pair of the spaced cavities.

PREFERRED MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
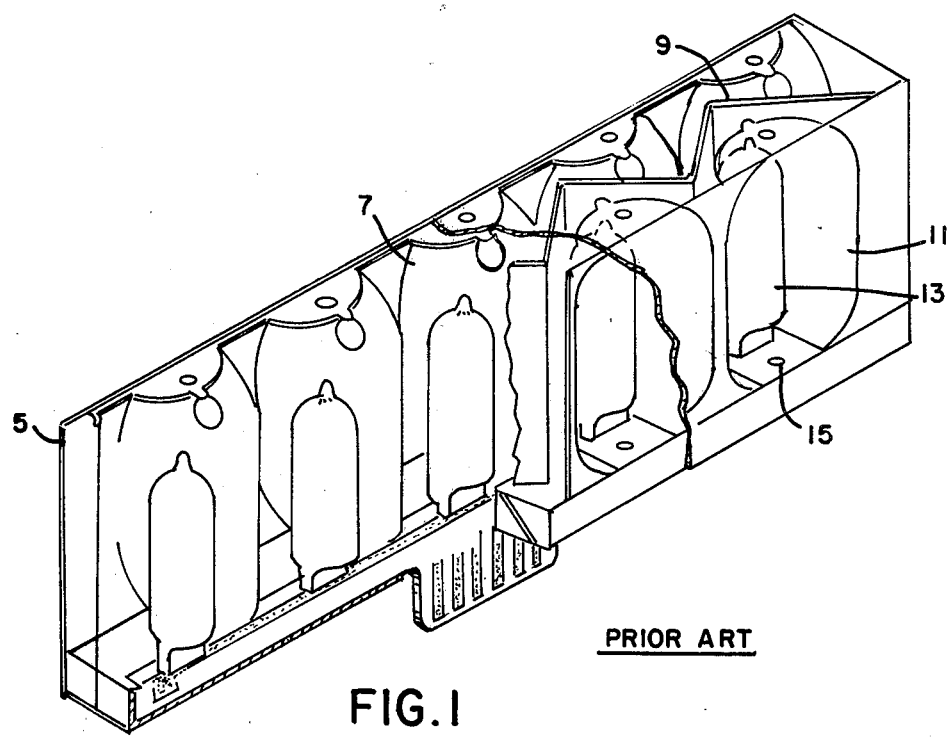
FIG. 1 illustrates a prior art multi-lamp photoflash unit having a venting aperture within a cavity of the unit.
Figure 3:
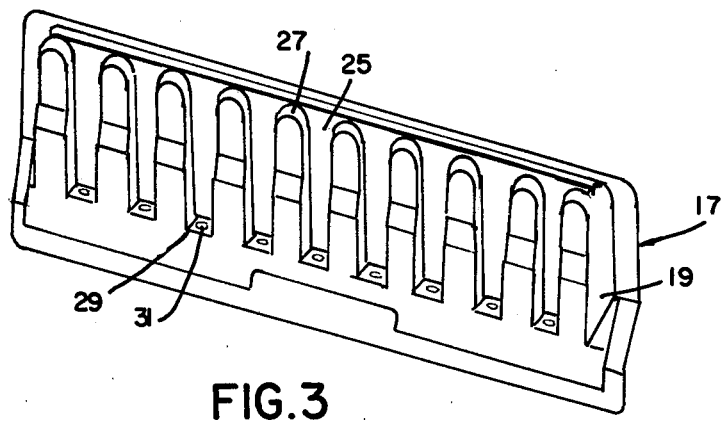
FIG. 3 is a rear view of a housing member of the invention having a plurality of cavities and apertures.
Figure 2:
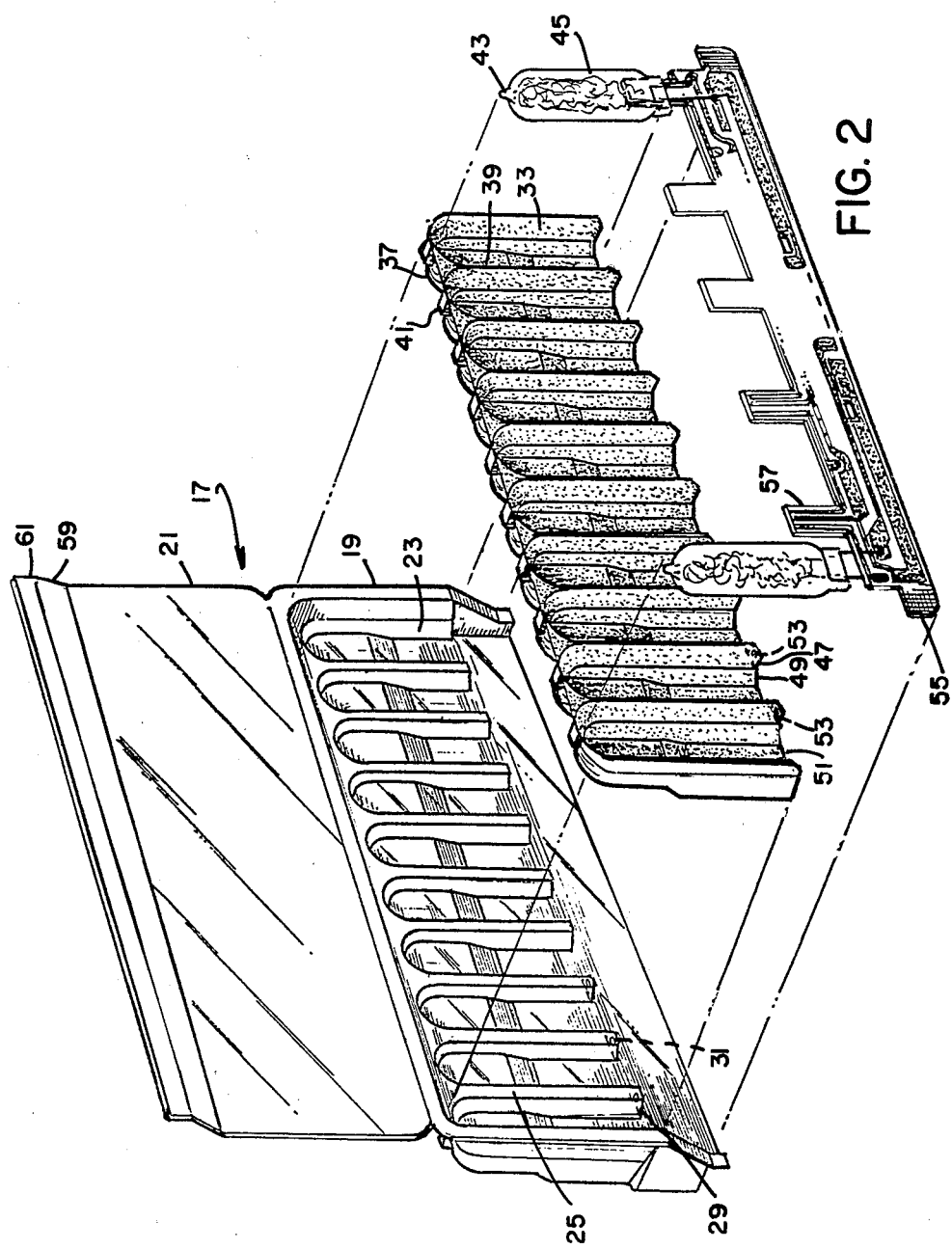
FIG. 2 is an exploded view of a preferred embodiment of a multi-lamp photoflash unit having a venting aperture.

Referring to the drawings, FIGS. 2 and 3 illustrate a preferred form of multi-lamp photoflash unit which includes an embodiment of the invention. Herein, a housing member 17 includes a back portion 19 and a front portion 21. The back portion 19 has a plurality of spaced cavities 23 preferably, although not necessarily, aligned in a single plane and direction. Each of the cavities 23 has a longitudinal axis with the axes of all of the cavities 23 in a parallel relationship with respect to one another.

Each pair of the cavities 23 has a junction 25 therebetween and this junction 25 extends to a spaced apart location 27 of FIG. 3. Extending intermediate the junction 25 and the spaced apart location 27 of each pair of the cavities 23 is a planar surface 29. Importantly, a venting aperture 31 is located in at least one and preferably in each one of the planar surfaces 29 intermediate each pair of the cavities 23.

It is to be noted that the venting aperture 31 is located in a planar surface 29 which is intermediate each pair of the cavities 23 as compared with the prior art configuration wherein venting was provided within the cavities 23. Thus, the present configuration provides a indirect path or passageway which extends from the interior to the exterior of the housing member 17 but does not provide a direct path for fragments or particles from the cavities 23 to the exterior of the housing member 17.

Further, an enhanced multi-lamp photoflash unit may include a reflector unit 33 which is formed to provide a plurality of spaced reflector cavities 35, each having a back portion 37 and a front portion 39. The back portion 37 is configured to nest within the cavities 23 of the housing member 17. The front portion 39 has a reflective surface thereon and has a notch 41 for receiving the tip portion 43 of a flashlamp 45.

As in the housing member 17, each pair of the spaced reflector cavities 35 has a junction 47 which extends to a spaced apart portion 49 at the back portion 37 of the reflector unit 33. A planar surface 51 extends normal to the longitudinal axes of the reflector cavities 35 and intermediate the junction 47 and spaced apart portion 49. A venting aperture 53 is again located in at least one, and preferably in each one of the planar surfaces 51. Also, the planar surfaces 51 of the reflector unit 33 and the planar surfaces 29 of the housing member 17 are in parallel and contacting relationship whereby sealing therebetween may be effected. Moreover, the venting apertures 53 of the reflector unit 33 and the venting apertures 31 of the housing member 17 are aligned to provide a path therethrough.

Finally, a printed circuit board 55 includes finger-like extensions 57, which are positioned within the cavities 35 of the reflector unit 33. The front portion 21 of the housing member 17 which has a tapered portion 59 and a flattened portion 61 is folded over to provide a sandwich-like seal with the printed circuit board 55 intermediate the flattened portion 61 and the back portion 19 of the housing member. Thus, one surface of the venting apertures 31 and 53 is enclosed while the other surface is exterior to the housing member 17.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

A multi-lamp photoflash unit has been provided which includes at least one and preferably multiple venting apertures for a plurality of flashlamp receiving cavities enclosed by a housing member. The venting apertures are located intermediate, rather than within, the cavities and thereby eliminate any direct line of flight for fragments from the flashlamps within the cavities. Thus, the structure insures that no direct path from the cavities to the exterior of the housing member is present and thus no direct path for projectiles from the flashlamps to the exterior of the housing member is present.

Additionally, not necessarily, a separate reflector unit may be introduced into the package and in this embodiment the above-described advantages and capabilities are also readily attained. Moreover, the added advantage and capability of sealing the reflector unit within the housing member at the apertured locations is available.

It is claimed:

1. In a multi-lamp photoflash unit having a housing member with a back portion and a front portion, said back portion formed to provide a plurality of spaced cavities, each contoured to receive a flashlamp and said front portion having a light transmitting portion formed to fold over and enclose said flashlamps within said cavities, the improvement wherein a venting aperture is disposed intermediate at least one pair of said spaced cavities of said back portion of said housing.

2. The multi-lamp photoflash unit of claim 1 wherein said back portion of said housing member includes a plurality of spaced cavities, each having a longitudinal axes, a planar surface normal to said longitudinal axis and intermediate at least one pair of said cavities and a venting aperture in said planar surface.

3. The multi-lamp photoflash unit of claim 1 wherein said plurality of spaced cavities of said back portion of said housing member are aligned in a single plane and a venting aperture is disposed intermediate each pair of said spaced cavities.

4. The multi-lamp photoflash unit of claim 1 wherein said plurality of spaced cavities of said back portion of said housing member are aligned in a single direction with a venting aperture disposed intermediate each pair of said cavities.

5. The multi-lamp photoflash unit of claim 1 wherein said light transmitting front portion is folded over and enclosed said flashlamp within said cavities and one surface intermediate said spaced cavities wherein said venting aperture is disposed.

6. A multi-lamp photoflash unit having a housing member with a back portion formed to provide a plurality of spaced cavities and a light transmitting front portion formed to fold over and enclose a flashlamp within each of said plurality of spaced cavities, said unit characterized by the improvement of a venting aperture disposed intermediate at least one pair of said spaced cavities.

7. The multi-lamp photoflash unit of claim 6 wherein a venting aperture is disposed intermediate each pair of said plurality of spaced cavities of said back portion of said housing member.

8. The multi-lamp photoflash unit of claim 6 wherein each of said plurality of cavities has a longitudinal axis and a planar surface normal to said longitudinal axis with a venting aperture therein disposed intermediate at least one pair of said plurality of spaced cavities.

9. The multi-lamp photoflash unit of claim 6 wherein each of said plurality of spaced cavities has a longitudinal axis with said horizontal axes extending parallel to one another and a plurality of planar surfaces each normal to said longitudinal axes and intermediate each pair of said spaced cavities and a venting aperture extending through each one of said planar surfaces.

10. The multi-lamp photoflash unit of claim 6 wherein each said plurality of spaced cavities has a longitudinal axis, a planar surface normal to said longitudinal axis is disposed intermediate each pair of said plurality of spaced cavities, a venting aperture extends through each one of said planar surfaces and said light transmitting front portion of said housing member encloses one surface of each of said venting apertures.

11. The multi-lamp photoflash unit of claim 6 wherein said light transmitting front portin of said housing member folds over and encloses said flashlamps within said cavities and one surface of said venting aperture with said other surface of said venting aperture exterior to said housing member.

* * * * *